United States Patent
Lai et al.

(10) Patent No.: US 12,526,050 B2
(45) Date of Patent: Jan. 13, 2026

(54) INDOOR DISTRIBUTION SYSTEM AND SIGNAL TRANSMISSION METHOD

(71) Applicant: COMBA NETWORK SYSTEMS COMPANY LIMITED, Guangdong (CN)

(72) Inventors: Quan Lai, Guangdong (CN); Manjiang Luo, Guangdong (CN); Haiyu Chen, Guangdong (CN); Shaohu Fang, Guangdong (CN); Jinqing Zhou, Guangdong (CN); Xin Li, Guangdong (CN)

(73) Assignee: COMBA NETWORK SYSTEMS COMPANY LIMITED, Guangzhou (CN)

( * ) Notice: Subject to any disclaimer, the term of this patent is extended or adjusted under 35 U.S.C. 154(b) by 242 days.

(21) Appl. No.: 18/274,994

(22) PCT Filed: Dec. 7, 2021

(86) PCT No.: PCT/CN2021/136204
§ 371 (c)(1),
(2) Date: Jul. 28, 2023

(87) PCT Pub. No.: WO2022/160949
PCT Pub. Date: Aug. 4, 2022

(65) Prior Publication Data
US 2024/0154702 A1 May 9, 2024

(30) Foreign Application Priority Data
Jan. 29, 2021 (CN) .......................... 202110129681.1

(51) Int. Cl.
*H04B 10/2575* (2013.01)
*H04B 10/27* (2013.01)
(Continued)

(52) U.S. Cl.
CPC ....... *H04B 10/27* (2013.01); *H04B 10/25753* (2013.01); *H04W 52/52* (2013.01); *H04B 2210/006* (2013.01); *H04W 88/085* (2013.01)

(58) Field of Classification Search
CPC .................................... H04B 10/2575
See application file for complete search history.

(56) References Cited

U.S. PATENT DOCUMENTS 6,014,546 A * 1/2000 Georges .................. H03L 7/23
  725/74
6,801,767 B1 * 10/2004 Schwartz ......... H04B 10/25755
  455/426.2

(Continued)

FOREIGN PATENT DOCUMENTS

CN 101090289 A 12/2007
CN 203788465 U 8/2014

(Continued)

OTHER PUBLICATIONS

International Search Report of PCT Patent Application No. PCT/CN2021/136204 issued on Feb. 23, 2022.

*Primary Examiner* — Jai M Lee

(57) ABSTRACT

Provided are an indoor distribution system and a signal transmission method. The system includes an access unit, an extended unit, a first coupling unit, and at least one remote cascaded chain. Each remote cascaded chain includes at least one second coupling unit and at least one remote unit. The at least one second coupling unit in each remote cascaded chain is cascaded, and each remote unit is respectively connected to a corresponding second coupling unit. The first coupling unit transmits a radio-frequency signal transmitted by the extended unit to the second coupling unit. The second coupling unit transmits a radio-frequency signal of input power to the remote unit connected to the second coupling unit according to a coupling value. The remote unit (Continued)

adjusts the power of the radio-frequency signal from the input power to the output target power and output the adjusted radio-frequency signal.

11 Claims, 9 Drawing Sheets

(51) Int. Cl.
*H04W 52/52* (2009.01)
*H04W 88/08* (2009.01)

(56) References Cited

U.S. PATENT DOCUMENTS

| | | | | |
|---|---|---|---|---|
| 7,917,177 | B2* | 3/2011 | Bauman | H04B 7/0842 |
| | | | | 455/562.1 |
| 9,343,797 | B2* | 5/2016 | Shoemaker | H01Q 21/28 |
| 9,509,377 | B2* | 11/2016 | Sayana | H04B 7/063 |
| 11,013,005 | B2* | 5/2021 | Lemson | H03F 3/24 |
| 11,522,630 | B1* | 12/2022 | He | H04B 10/506 |
| 11,923,905 | B2* | 3/2024 | Luo | H04B 10/25753 |
| 2010/0002626 | A1* | 1/2010 | Schmidt | A47C 1/146 |
| | | | | 370/328 |
| 2014/0148214 | A1* | 5/2014 | Sasson | H01Q 1/32 |
| | | | | 455/522 |
| 2015/0380928 | A1* | 12/2015 | Saig | H04B 1/04 |
| | | | | 361/54 |
| 2016/0345259 | A1* | 11/2016 | Heidler | H04W 52/0206 |
| 2017/0118768 | A1* | 4/2017 | Seo | H04B 1/38 |
| 2023/0283304 | A1* | 9/2023 | Hofman | H04B 1/0057 |
| | | | | 370/278 |

FOREIGN PATENT DOCUMENTS

| | | |
|---|---|---|
| CN | 205847266 U | 12/2016 |
| CN | 110278011 A | 9/2019 |
| CN | 209767546 U | 12/2019 |
| CN | 111010680 A | 4/2020 |
| CN | 214315621 U | 9/2021 |

* cited by examiner

INDOOR DISTRIBUTION SYSTEM AND SIGNAL TRANSMISSION METHOD

The present disclosure is a national stage application of PCT international application No. PCT/CN2021/136204 filed on Dec. 7, 2021, which claims priority to Chinese Patent Application No. 2021101296811, filed with the China Patent Office on Jan. 29, 2021, and entitled "INDOOR DISTRIBUTION SYSTEM AND SIGNAL TRANSMISSION METHOD", the entire content of which is incorporated herein in its entirety.

TECHNICAL FIELD

The present disclosure relates to the field of communication technologies, and in particular, to an indoor distribution system and a signal transmission method.

BACKGROUND

A coupling unit in an analog indoor distribution system is used for adjusting power of a signal outputted by an extended unit and transmitting the signal to a remote unit.

During the construction of the analog indoor distribution system, various factors such as feeder loss, input signal strength, and power of a destination node are required to be taken into account in the design of a coupling value of the coupling unit. For example, if the coupling unit (and the remote unit connected thereto) is further from the extended unit, input power during transmission is lower, and the coupling value thereof is required to be designed to be smaller. If multi-stage antenna deployment is required, various coupling units are required to be deployed according to different requirements for coupling values, and the relative positions of different coupling units and other coupling units in the system cannot be changed, which will increase the difficulty of field construction.

SUMMARY

In a first aspect, the present disclosure provides an indoor distribution system, including: an access unit, an extended unit, a first coupling unit, and at least one remote cascaded chain. Each remote cascaded chain includes at least one second coupling unit and at least one remote unit. Each remote unit includes a signal processing module.

The at least one second coupling unit in each remote cascaded chain is cascaded, and each remote unit is respectively connected to its corresponding second coupling unit.

The first coupling unit transmits a radio-frequency signal transmitted by the extended unit to each second coupling unit.

The at least one second coupling unit transmits a radio-frequency signal with input power to the remote unit connected to the second coupling unit according to a coupling value.

The at least one remote unit adjusts the power of the radio-frequency signal from the input power to a target power, through the signal processing module, according to the input power and the target power, and outputs the adjusted radio-frequency signal.

In a second aspect, the present disclosure provides a signal transmission method applied to an indoor distribution system. The indoor distribution system includes an access unit, an extended unit, a first coupling unit, and at least one remote cascaded chain. Each remote cascaded chain includes at least one second coupling unit and at least one remote unit. Each remote unit includes a signal processing module. The at least one second coupling unit in each remote cascaded chain is cascaded, and each remote unit is respectively connected to its corresponding second coupling unit. The method includes: transmitting, by the first coupling unit, a radio-frequency signal transmitted by the extended unit to the at least one second coupling unit; transmitting, by the at least one second coupling unit, a radio-frequency signal with input power to the remote unit connected to the at least one second coupling unit according to a coupling value; and adjusting, by the at least one remote unit, through the signal processing module, the power of the radio-frequency signal from the input power to target power according to the input power and the target power, and outputting adjusted radio-frequency signal.

REFERENCE SIGNS

100: access unit; 110: first digital processing module; 120: first optical transceiver module; 130: first circuit; 140: second circuit; 150: third circuit; 160: fourth circuit; 200: extended unit; 210: second digital processing module; 220: signal conversion module; 230: second optical transceiver module; 300: first coupling unit; 400: remote cascaded chain; 410: second coupling unit; 420: remote unit; 421: signal processing module; 422: monitoring processing module.

DETAILED DESCRIPTION OF THE EMBODIMENTS

In some scenarios, during design and construction of an indoor distribution system, various factors such as a feeder length, feeder loss, input signal strength, and power of a destination node are required to be taken into account in the design of coupling values (ratios of power of respective output terminals) of coupling units.

Figure 1:
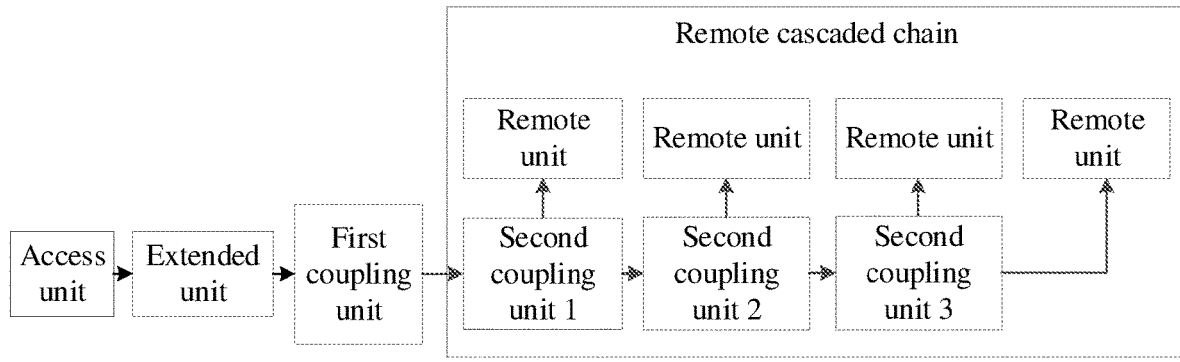
FIG. 1 is a schematic diagram of a partial structure of an indoor distribution system in the prior art.

Exemplarily, FIG. 1 is a schematic diagram of a partial structure of an indoor distribution system in the prior art. The indoor distribution system includes an access unit, an extended unit, a first coupling unit, and at least one remote cascaded chain (which is assumed to be one remote cascaded chain herein). Each remote cascaded chain includes at least one second coupling unit and at least one remote unit (it is assumed herein that the remote cascaded chain includes a second coupling unit 1, a second coupling unit 2, and a second coupling unit 3 in cascaded connection). Each second coupling unit is connected to one remote unit. Assuming that power loss of a transmission line is not considered, that is, the power loss of the transmission line is zero, output power of the first coupling unit is P, and input power of the remote unit is P/4, coupling values of the second coupling units (the coupling values are defined as ratios of power of respective output terminals) are respectively as follows.

The coupling value of the second coupling unit 1 is 3:1, obtained by (P−0.25P)/0.25P.

The coupling value of the second coupling unit 2 is 2:1, obtained by (P−0.25P−0.25P)/0.25P.

The coupling value of the second coupling unit 3 is 1:1, obtained by (P−0.25P−0.25P−0.25P)/0.25P.

Then, the remote cascaded chain is required to use three types of coupling units, so as to complete the design of the indoor distribution system.

As can be seen from the above, if multi-level deployment of coverage points is required, various coupling units are required to be deployed according to different requirements for coupling values, and the relative positions of different coupling units and other coupling units in the system cannot be changed, which increases the difficulty of field construction, and the system is difficult to maintain.

In some other scenarios, in order to reduce the difficulty of field construction, in the indoor distribution system provided in embodiments of the present disclosure, coupling units with a same coupling value are deployed on each remote cascaded chain, and the remote unit automatically adjusts the power of the radio-frequency signal to the target power, and outputs the radio-frequency signal at the target power, thereby reducing the difficulty of field design and construction and improving efficiency of the field design and construction of the indoor distribution system.

Figure 2:
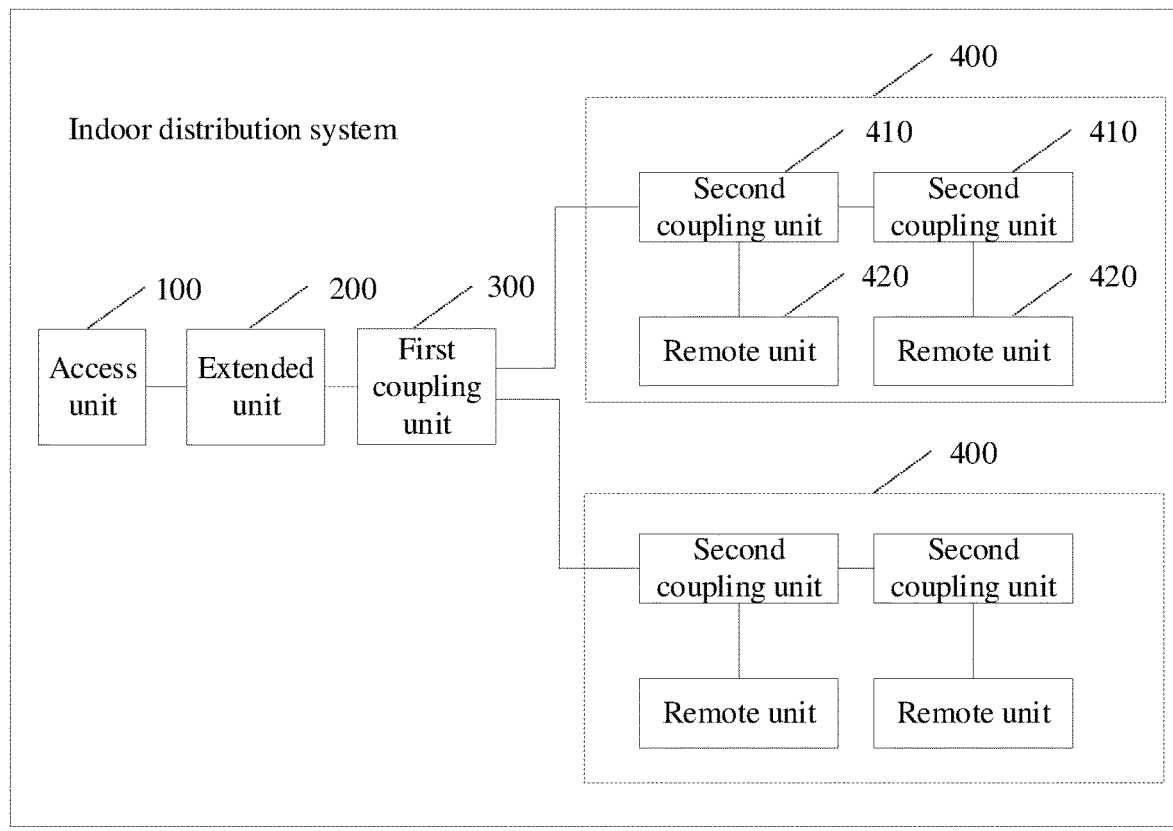
FIG. 2 is a schematic structural diagram of an indoor distribution system according to an embodiment of the present disclosure.

FIG. 2 is a schematic structural diagram of an indoor distribution system according to an embodiment of the present disclosure. As shown in FIG. 2, the system in this embodiment may include an access unit 100, an extended unit 200, a first coupling unit 300, and at least one remote cascaded chain 400. Each remote cascaded chain 400 includes at least one second coupling unit 410 and at least one remote unit 420. Each remote unit 420 includes a signal processing module.

The at least one second coupling unit 410 in each remote cascaded chain 400 is cascaded, and each remote unit 420 is respectively connected to a corresponding second coupling unit 410.

The first coupling unit 300 transmits a radio-frequency signal transmitted by the extended unit to the second coupling units 410.

The second coupling unit 410 transmits a radio-frequency signal with input power to the remote unit 420 connected to the second coupling unit 410 according to a coupling value.

The remote unit 420 controls the gain of the signal processing module to adjust the power of the radio-frequency signal from the input power to a target power according to the input power and the target power, and outputs the adjusted radio-frequency signal.

In some embodiments, the access unit 100 performs optional analog-to-digital conversion, processing of data of a relevant input path, interface conversion, rate adjustment, and the like, and transmits a processed signal to the extended unit 200.

In some embodiments, the extended unit 200 performs aggregation, distribution, and analog-to-digital conversion of interface data of the access unit 100, and is connected to the first coupling unit 300 for inputting and outputting the radio-frequency signal.

In some embodiments, the remote unit 420 is configured for amplification of the radio-frequency signal, gain control, optional clock signal extraction and recovery, and frequency conversion functions.

In practical application, the access unit 100 receives a signal transmitted by a base station or a core network, and sends the signal to the extended unit 200. The extended unit 200 converts the signal into a radio-frequency signal and sends the radio-frequency signal to each remote cascaded chain 400 by means of the first coupling unit 300. The first coupling unit 300 is connected to the first-stage second coupling unit 410 in each remote cascaded chain 400. The first-stage second coupling unit 410 in each remote cascaded chain 400 receives the radio-frequency signal. Each second coupling unit 410 sends the radio-frequency signal to the remote unit 420 connected thereto and a next-stage second coupling unit 410 according to an own coupling value. The final-stage second coupling unit 410 may be connected to two remote units 420. Correspondingly, each remote unit 420 receives the radio-frequency signal, acquires an input power of the received radio-frequency signal, controls the signal processing module thereof to adjust the power of the radio-frequency signal from the input power to the target power according to the input power and a target power, and outputs the adjusted radio-frequency signal. For example, an attenuator connected to the signal processing module may be adjusted according to the input power and the target power, so that the power of the radio-frequency signal outputted by the remote unit 420 is the target power. The target power is preset. Same target power may be set for each remote unit 420, resulting in uniform signal coverage.

In some embodiments, coupling values of the second coupling units 410 included in each remote cascaded chain 400 are the same.

In practical application, the coupling values of the second coupling units 410 included in each remote cascaded chain 400 are the same. The same coupling units may be selected, the remote units 420 are also the same, and each remote unit 420 can be automatically adjusted to output the radio-frequency signal with the target power, so that the design and construction are more convenient, improving the design and construction efficiency.

Exemplarily, it is assumed that the indoor distribution system includes one remote cascaded chain 400, and the remote cascaded chain 400 includes three second coupling units 410 in cascaded connection. For example, the three second coupling units 410 are respectively labeled as a second coupling unit 1, a second coupling unit 2, and a second coupling unit 3. The second coupling unit 3 is respectively connected to two remote units 420. The second coupling unit 1, the second coupling unit 2, and the second coupling unit 3 are successively connected, and the second coupling unit 1 is connected to the first coupling unit 300. The second coupling unit 1, the second coupling unit 2, and the second coupling unit 3 are all coupling units with a coupling value of 3:1. Output power of the first coupling unit 300 is P, and the target power is P/4.

Since the remote unit 420 has an output power control function, as long as the target power is determined, the remote unit 420 can automatically calculate the gain, thereby adjusting itself to output the radio-frequency signal with the target power. On this assumption, the remote unit 420 can automatically adjust its own gain (a ratio of the target power to the input power) according to the input power respectively to: 0.25P/0.25P=1, 0.25P/0.1875P=1.33, 0.25P/0.1406P=1.78, and 0.25P/0.4218P=0.59. Then, it can be ensured that each remote unit 420 outputs a radio-frequency signal with power of 0.25P. On this assumption, identical second coupling units 410 may be used in the remote cascaded chain 400.

Further, coupling values of the first coupling unit and the second coupling unit are the same.

In some embodiments, coupling values of the second coupling units 410 included in different remote cascaded chains 400 are the same or different.

The coupling values of the second coupling units 410 included in different remote cascaded chains 400 may be the same or different. That is, the second coupling units 410 included in different remote cascaded chains 400 may be a same type of coupling units or different types of coupling units.

In a case where the coupling values of the second coupling units 410 included in different remote cascaded chains 400 are the same, that is, the second coupling units 410 and the remote units 420 in the indoor distribution system are both the same, overall design and construction difficulties of the indoor distribution system are reduced.

In a case where the coupling values of the second coupling units 410 included in different remote cascaded chains 400 are different, the respective remote cascaded chains 400 are more convenient in design and construction, and different remote cascaded chains 400 are deployed at different physical positions, for example, on different floors. Then the coupling values of the second coupling units 410 included in different remote cascaded chains 400 are different. However, the coupling values of the second coupling units 410 included in the same remote cascaded chain 400 are the same, and each remote cascaded chain 400 is more convenient in design and construction, so that the indoor distribution system is also more convenient in design and construction, reducing the design and construction difficulties.

In this embodiment, the second coupling unit divides output power thereof according to a coupling value, and transmits the radio-frequency signal to the remote unit connected thereto and a next-stage second coupling unit. The remote unit automatically controls the gain of the signal processing module thereof according to the input power and the target power, and outputs the radio-frequency with the target power. The input power of the radio-frequency signal received by each remote unit is not the same, but the radio-frequency signal with the target power may be outputted through adjustment of the remote unit, so that the second coupling units in the remote cascaded chain can be set to one type. Therefore, the design and construction difficulties are reduced, thereby improving the design and construction efficiency, and improving the feasibility of the indoor distribution system.

Figure 3:
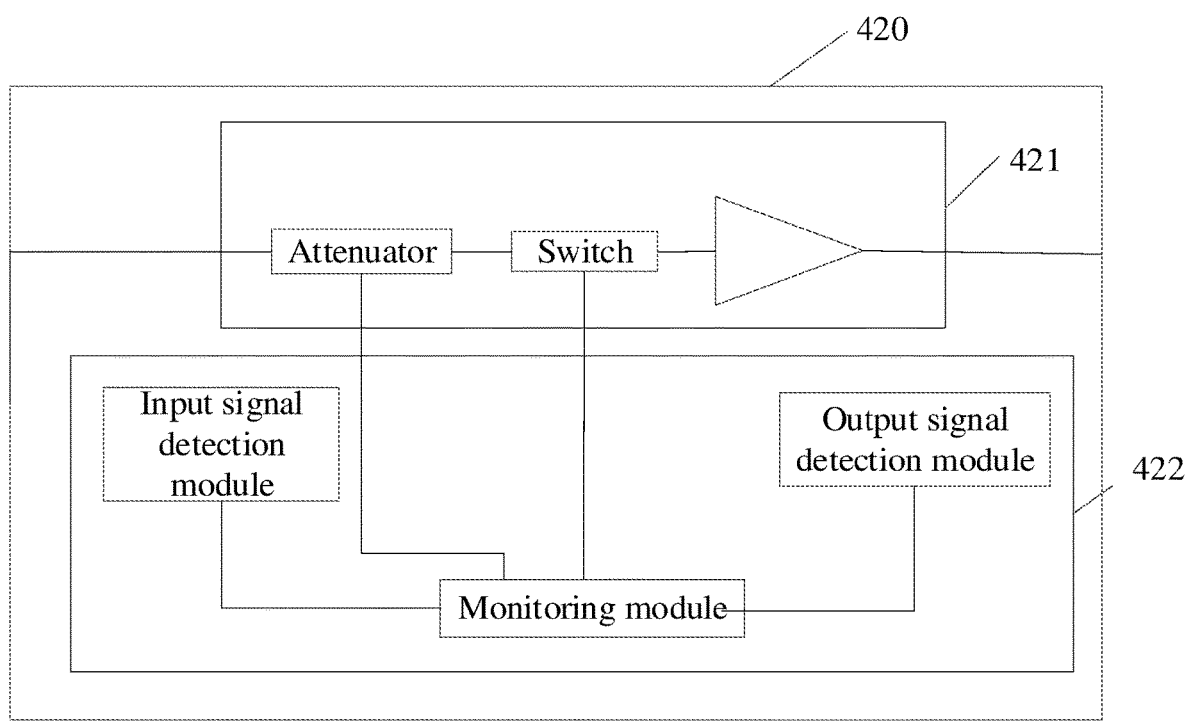
FIG. 3 is a schematic structural diagram of a remote unit according to an embodiment of the present disclosure.

FIG. 3 is a schematic structural diagram of a remote unit according to an embodiment of the present disclosure. FIG. 3 is based on the embodiment shown in FIG. 2. Further, as shown in FIG. 3, a signal processing module 421 includes an attenuator, a switch, and an amplifier. The remote unit in this embodiment further includes a monitoring processing module 422. The monitoring processing module 422 includes an input signal detection module and a monitoring module.

The monitoring module is respectively connected to the input signal detection module and an output signal detection module. The attenuator is successively connected to the switch and the amplifier. The monitoring module is respectively connected to the attenuator and the switch.

The attenuator receives the radio-frequency signal with the input power transmitted by the second coupling unit.

The input signal detection module determines input power and transmits the input power to the monitoring module.

The monitoring module adjusts the attenuator and the switch according to the input power and a target power, so that the amplifier outputs a radio-frequency signal with the target power.

In some embodiments, the input signal detection module further realizes input signal characteristic detection. The input signal characteristic detection may include, but is not limited to, the detection of one or more of the following characteristics: an input power, a standing wave, a signal type, and a signal state.

In some embodiments, the monitoring module is further configured for input signal monitoring, output signal monitoring, and/or the like.

In some embodiments, the remote unit may further include an output signal detection module.

The output signal detection module is configured for realizing output signal characteristic detection. The output signal characteristic detection may include, but is not limited to, the detection of one or more of the following characteristics: an output power, a standing wave, a signal type, and a signal state.

In some embodiments, the signal processing module 421 further includes a frequency converter.

In practical application, the remote unit receives the radio-frequency signal with the input power transmitted by the second coupling unit. The input signal detection module detects the radio-frequency signal, determines the input power, and sends the input power to the monitoring module. The monitoring module determines a gain value according to the input power (input signal strength) and the target power, and controls the attenuator and the switch on the signal transmission link to cause the amplifier to output the radio-frequency signal with the target power.

In this embodiment, the monitoring module determines the gain value according to the input power determined by the input signal detection module and the target power, and controls the attenuator and the switch on the signal transmission link to cause the amplifier to output the radio-frequency signal with the target power, thereby achieving a gain control, so that, when the input power is different, the remote unit can be automatically adjusted according to the target power, so as to output the radio-frequency signal with the target power, and the second coupling units in the remote cascaded chain may be set to one type, thereby reducing the design and construction difficulties and improving the design and construction efficiency.

On the basis of the above embodiments, further, the extended unit is configured for sending a power supply signal and a radio-frequency signal to the first coupling unit.

The first coupling unit is configured for sending the power supply signal and the radio-frequency signal to the remote cascaded chain.

The second coupling unit is configured for sending the power supply signal and the radio-frequency signal to the remote unit connected thereto and other second coupling units connected thereto, respectively.

In practical application, power of the first coupling unit and the remote cascaded chain may be supplied by the extended unit. That is, in addition to transmitting the radio-frequency signal to the remote cascaded chain through the first coupling unit, the extended unit can also provide a power supply voltage to the first coupling unit and the remote cascaded chain by means of a transmission line. The extended unit sends the power supply signal and the radio-frequency signal to the first coupling unit. The first coupling unit separates the power supply signal from the radio-frequency signal, and then distributes the power supply signal and the radio-frequency signal according to a quantity of connected remote cascaded chains. Correspondingly, when the second coupling unit in the remote cascaded chain receives the power supply signal and the radio-frequency signal, the power supply signal and the radio-frequency signal are also first separated, and then are combined and transmitted to a next-stage second coupling unit and the remote unit.

In this embodiment, the power supply signal and the radio-frequency signal of the first coupling unit and the remote cascaded chain are provided by the extended unit, and the power supply signal can be transmitted using the existing transmission line for the radio-frequency signal. In the indoor distribution system, there are more unit devices in the remote cascaded chain than the extended unit, so a large number of external power lines can be saved, which reduces the construction difficulty and improves construction efficiency of the indoor distribution system.

In some other scenarios, since a digital indoor distribution system can perform transmission by using an optical fiber or a network cable, with the application of high bandwidth in the 5G era, optical modules or electrical modules require higher and higher specifications. Taking a shared application of a 5G indoor distribution system as an example, if the remote unit implements transmission with four transmit and four receive antennas (4T4R) multiple input multiple output (MIMO), dual carriers, 100 MHz for each carrier, and adopts a standard CPRI 8.0 protocol, then the bandwidth required by the remote unit is 39321.6 Mbps, obtained by:

$$2^{[1]}*122.88 \text{ Mbps}^{[2]}*2^{[3]}*15^{[4]}*(16/15)^{[5]}*(10/8)^{[6]}*4^{[7]},$$

where [1] 2 denotes the number of the carriers is two (carrier number);
[2] 122.88 Mbps denotes a standard sampling rate of a 100 MHz signal;
[3] 2 denotes the two data: I and Q (I/Q data); [4] 15 denotes a standard transmission bit width of 15 bits;
[5] 16/15 denotes transmission control overhead of a Common Public Radio Interface (CPRI);
[6] 10/8 denotes overhead of photoelectric conversion.

Ethernet transmission (based on an 802.3ae protocol) supports up to 10 Gbps and requires at least four Cat7-type network cables for transmission. In addition, the extended unit and the remote unit are also required to support four 10-gigabit network processors, increasing the cost and the complexity of the indoor distribution system. In the case of optical fiber transmission, an optical module and a Field Programmable Gate Array (FPGA) device that support 25 Gbps in the industry are used, and two sets of optical modules and FPGA interfaces are also required. However, this increases the cost and the complexity of the indoor distribution system.

Further, in an embodiment of the present disclosure, the solution of using the radio frequency cable or feeder can save a lot of optical interface resources, thereby saving the overall cost and reducing the complexity of the indoor distribution system.

In a possible design, in the indoor distribution system, all stages of unit devices after the extended unit are connected by radio frequency cables.

The at least one second coupling unit in each remote cascaded chain is cascaded by means of a radio frequency cable, and each second coupling unit is connected to one remote unit by means of a radio frequency cable. The first coupling unit is connected to the first-stage second coupling unit in each remote cascaded chain by means of a radio frequency cable.

In some embodiments, the radio frequency cable may be a bundled cable.

Figure 4:
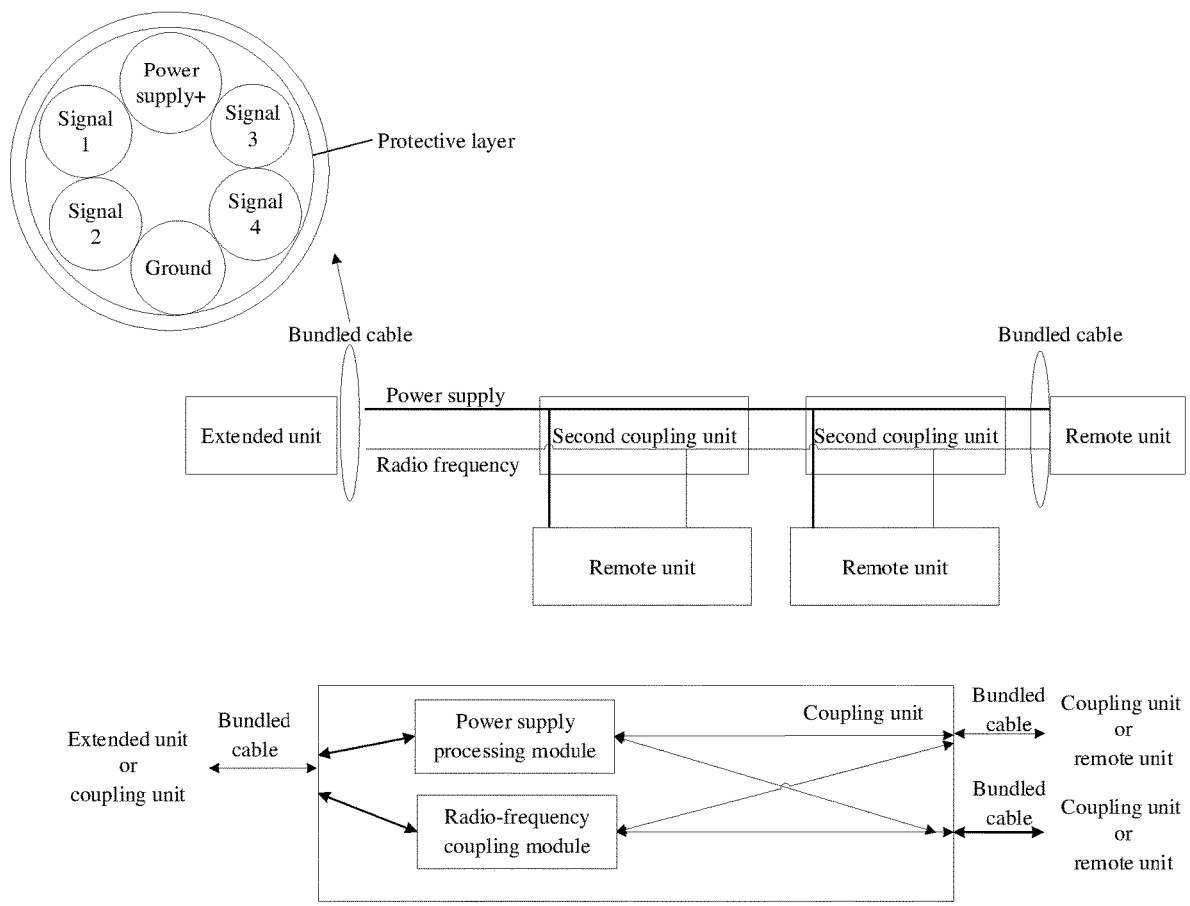
FIG. 4 is a schematic topological architecture and structure diagram of a coupling unit according to an embodiment of the present disclosure.

FIG. 4 is a schematic topological architecture and structure diagram of a coupling unit according to an embodiment of the present disclosure. As shown in FIG. 4, the coupling unit includes a power supply processing module and a radio-frequency coupling module. The coupling unit may be the first coupling unit or the second coupling unit. The power supply processing module may include, but is not limited to, one or more of the following processing manners: input voltage detection, input current detection, input power signal filtering, output power supply distribution, output voltage filtering, output power detection, and the like. The radio-frequency coupling module may include, but is not limited to, any one or any combination of the following processing manners: input signal filtering, and distribution of a radio-frequency signal of an input signal to an output port.

In this embodiment, the coupling unit separates the power supply signal and radio-frequency signal by means of the radio frequency cable, and the power supply signal and radio-frequency signal are transmitted to the next-stage coupling unit or the remote unit after being processed by the coupling unit. The use of the radio frequency cable for transmission can save the cost compared to the use of the optical fiber. In addition, for more and more 4T4R application scenarios in the 5G indoor distribution system, more feeders and couplers are required to be deployed in the analog indoor distribution system, leading to more difficult overall construction and a high cost. In the present disclosure, through the solution of the radio frequency cable, the 4T4R requirement can be met only with one deployment. In addition, in post-maintenance, since each remote unit can be controlled separately, in idle periods and regions with few people, a specified remote unit can be separately controlled to shut down or reduce the transmission power to achieve the purpose of energy saving and emission reduction, which is also a difficult function for the analog indoor distribution system to implement.

In another possible design, in the indoor distribution system, all stages of unit devices after the extended unit are connected by feeders.

The at least one second coupling unit in each remote cascaded chain is cascaded by means of a feeder, and each second coupling unit is connected to one remote unit by means of a feeder. The first coupling unit is connected to the first-stage second coupling unit in each remote cascaded chain by means of a feeder.

Figure 5:
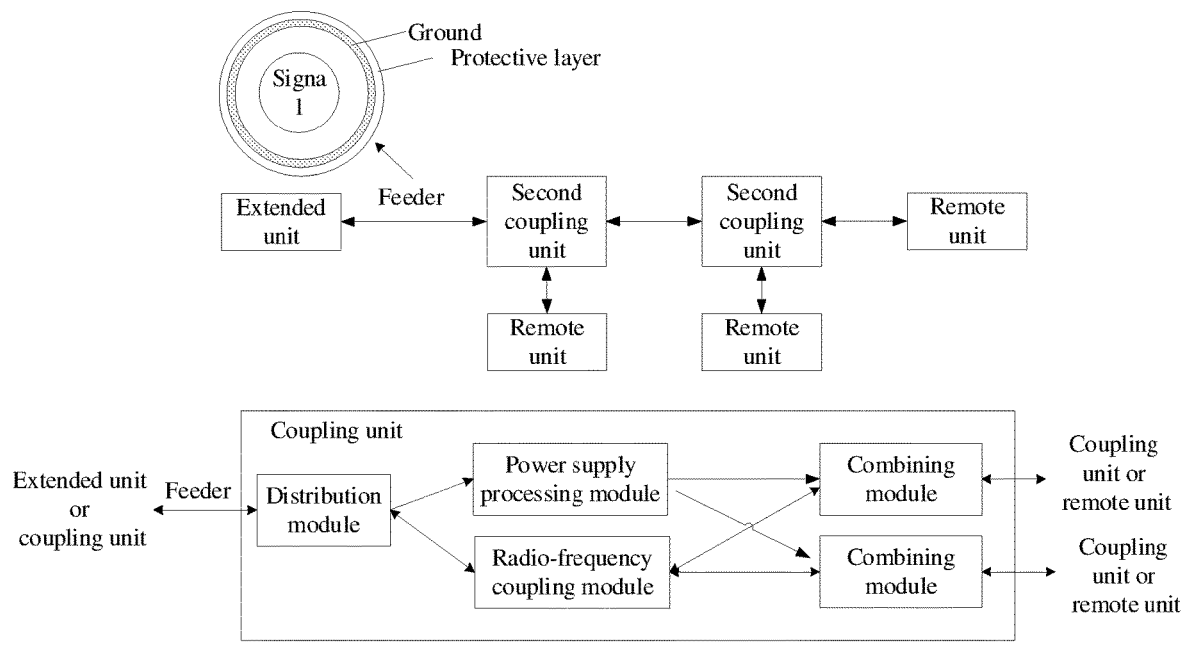
FIG. 5 is a schematic topological architecture and structure diagram of another coupling unit according to an embodiment of the present disclosure.

FIG. 5 is a schematic topological architecture and structure diagram of another coupling unit according to an embodiment of the present disclosure. As shown in FIG. 5, the coupling unit includes a distribution module, a power supply processing module, a radio-frequency coupling module, and a combining module. The coupling unit may be the first coupling unit or the second coupling unit. The distribution module separates the power supply signal and the radio-frequency signal by means of a filter. The power supply processing module may include, but is not limited to, one or more of the following processing manners: input voltage detection, input current detection, input power signal filtering, output power supply distribution, output voltage filtering, output power detection, and the like. The radio-frequency coupling module may include, but is not limited to, one or more of the following processing manners: input signal filtering, and distribution of a radio-frequency signal of an input signal to an output port. The combining module combines the power supply signal and the radio-frequency signal by means of a combiner and then outputs the power supply signal and the radio-frequency signal to the next-stage coupling unit or the remote unit.

In this embodiment, the power supply signal and the radio-frequency signal of the extended unit are transmitted to the coupling unit by means of a feeder, and the power supply signal and the radio-frequency signal are separated in the coupling unit and are transmitted to the next-stage coupling unit or the remote unit. Therefore, optical devices are saved.

Correspondingly, the remote unit is connected to the second coupling unit for power supply extraction, monitoring information generation, processing of the radio-frequency signal, and transmitting of the radio-frequency signal to an antenna.

Figure 6:
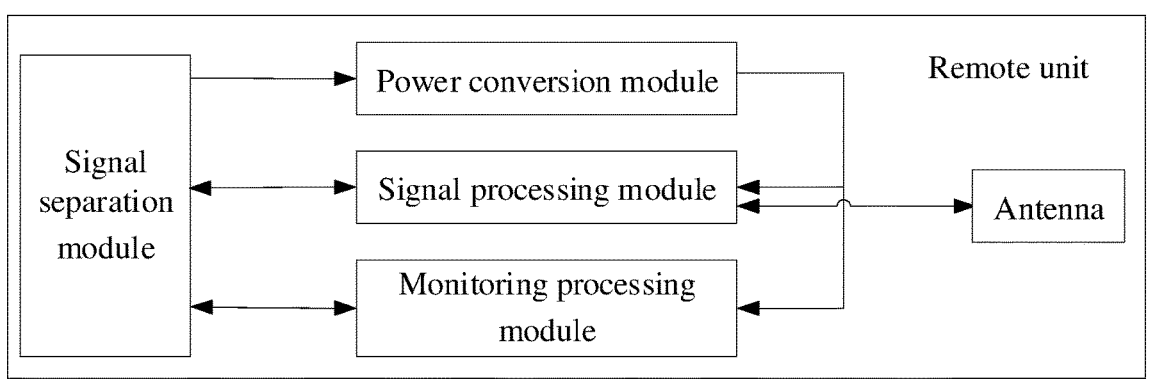
FIG. 6 is a schematic structural diagram of another remote unit according to an embodiment of the present disclosure.

FIG. 6 is a schematic structural diagram of another remote unit according to an embodiment of the present disclosure. FIG. 6 is based on the above embodiments. Further, as shown in FIG. 6, the remote unit includes a signal separation module, a power supply module, a signal processing module, a monitoring processing module, and an antenna module.

The signal separation module separates a power supply signal, a radio-frequency signal, and a monitoring signal, and transmits the separated power supply signal, radio-frequency signal, and monitoring signal to the power supply module, the signal processing module, and the monitoring processing module, respectively.

Functions of the signal separation module may include, but are not limited to, one or more of the following: DC signal separation, DC signal filtering, radio-frequency signal detection and filtering, radio-frequency signal output power adjustment, monitoring signal modulation and demodulation, and the like.

The power supply module processes the power supply signal transmitted by the signal separation module, and then distributes the power supply signal to the monitoring processing module and the signal processing module as a power supply. A function of the power supply module may include, but is not limited to, one or more of the following processing manners: input voltage detection, input current detection, input power signal filtering, output voltage filtering, output power detection, and the like.

The signal processing module performs radio-frequency domain signal processing on the radio-frequency signal transmitted by the signal separation module, and then transmits the radio-frequency signal to the antenna module. In addition, the signal processing module also performs radio-frequency domain signal processing on a signal from the air received by the antenna module and then transmits the signal to the signal separation module. The radio-frequency domain signal processing may include, but is not limited to, one or more of the following processing manners: radio-frequency signal filtering, radio-frequency signal amplification, radio-frequency signal attenuation, radio-frequency up-conversion, radio-frequency down-conversion, envelope signal extraction and comparison, Time Division Duplexing (TDD) signal switch control, output signal power control, output port standing wave detection, output port power detection, and the like.

The monitoring processing module generates a monitoring signal for the remote unit and transmits the monitoring signal to the signal processing module. The monitoring processing module includes, but is not limited to, one or more of the following processing manners: key index monitoring and management, alarm monitoring and reporting, software upgrade and rollback, status quantity reporting, and the like.

The antenna module transmits the signal transmitted by the signal processing module to the air, and at the same time, transmits a radio-frequency signal in the air to the signal processing module.

Figure 7:
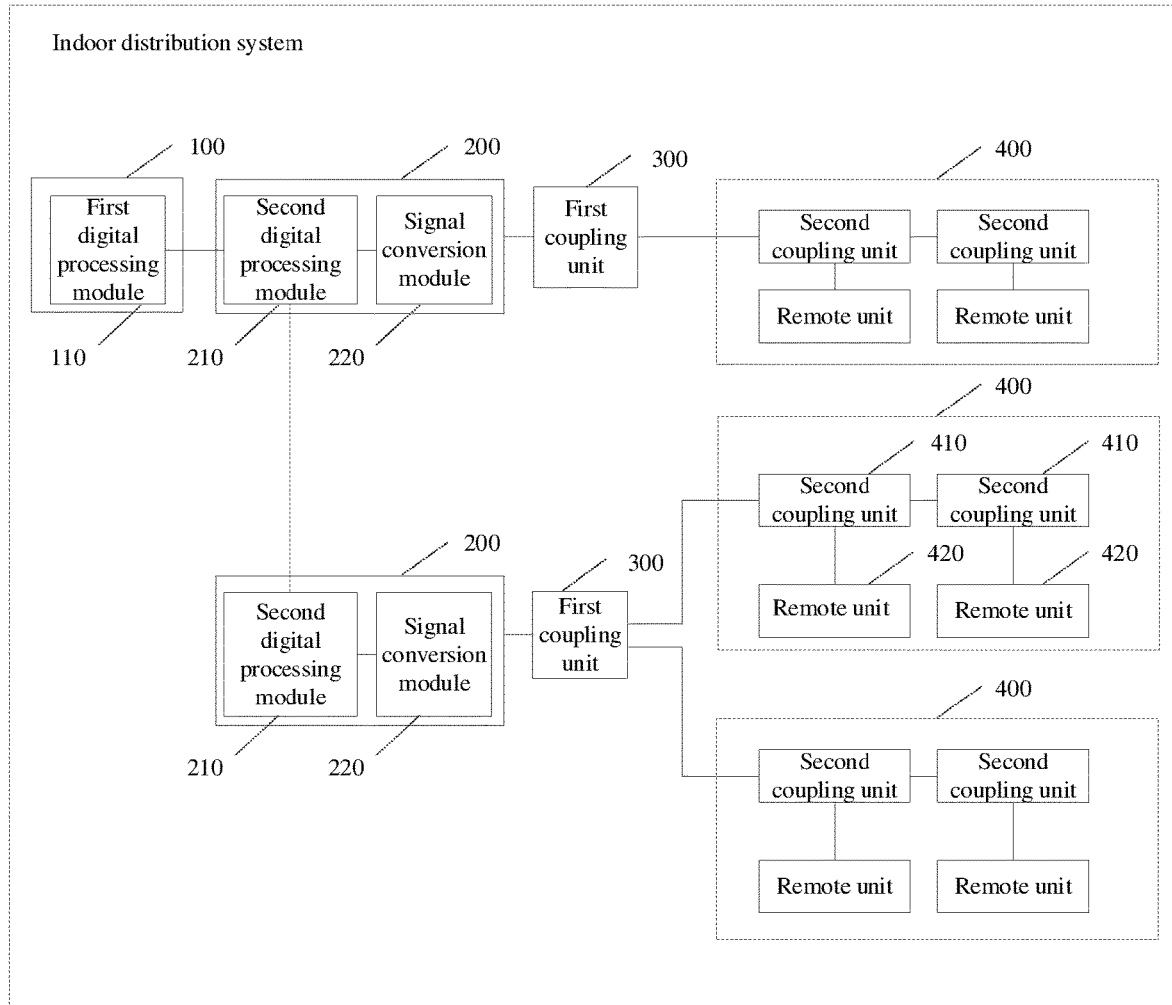
FIG. 7 is a schematic structural diagram of another indoor distribution system according to an embodiment of the present disclosure.

FIG. 7 is a schematic structural diagram of another indoor distribution system according to an embodiment of the present disclosure. FIG. 7 is based on the embodiments shown in FIG. 2 to FIG. 6. Further, as shown in FIG. 7, the access unit 100 includes a first digital processing module 110, and the extended unit 200 includes a second digital processing module 210 and a signal conversion module 220.

The extended unit 200 is connected to the first coupling unit 300. The extended unit 200 is directly connected to the access unit 100, or is connected to the access unit 100 by means of another extended unit 200.

The access unit 100 performs first processing on a received signal by means of the first digital processing module 110 to obtain a first digital signal, and transmits the first digital signal to the extended unit 200.

The extended unit 200 performs second processing on the first digital signal by means of the second digital processing module 210 and the signal conversion module 220 to obtain a first analog signal, and transmits the first analog signal to the first coupling unit 300.

In some embodiments, one or more extended units 200 may be connected to the access unit 100. There may be one or more extended units 200 on a link of the access unit 100 and any first coupling unit 300.

In some embodiments, the first digital processing module 110 may include, but is not limited to, one or more of the following: an FPGA, an Application Specific Integrated Circuits (ASIC), a Complex Programmable Logic Device (CPLD), and the like, which is not limited in the present disclosure.

In some embodiments, the second digital processing module 210 may include, but is not limited to, one or more of the following: an FPGA, an ASIC, a CPLD, and the like, which is not limited in the present disclosure.

In some embodiments, the access unit 100 is connected to the extended unit 200 by means of an optical fiber or a network cable. The extended unit 200 is connected to another extended unit 200 by means of an optical fiber or a network cable.

In practical application, an access signal of the access unit 100 may be a signal transmitted by a remote radio unit (RRU) of a base station, which is an analog signal, or a signal transmitted by a base band unit (BBU) of the base station or a core network, which is a digital signal.

In a case where the access signal of the access unit 100 is an analog signal, the access unit 100 converts the analog signal into a digital signal, inputs the digital signal into the first digital processing module 110 to obtain a first digital signal, and then transmits the first digital signal to the second digital processing module 210 of the extended unit 200.

In a case where the access signal of the access unit 100 is a digital signal, the access unit 100 inputs the digital signal into the first digital processing module 110 to obtain a first digital signal, and then transmits the first digital signal to the second digital processing module 210 of the extended unit 200.

The second digital processing module 210 and the signal conversion module 220 in the extended unit 200 process the first digital signal. The processing performed by the second digital processing module 210 includes one or more of the following processing: digital combining, signal framing, signal deframing, signal serial-to-parallel conversion, signal parallel-to-serial conversion, clock recovery, digital up-conversion processing, digital down-conversion processing, and monitoring signal extraction and processing. The second digital processing module 210 transmits the processed first digital signal to the signal conversion module 220. The signal conversion module 220 may be configured for performing digital-to-analog conversion on the signal transmitted by the second digital processing module 210, and transmitting a first analog signal obtained by digital-to-analog conversion to the first coupling unit 300. Correspondingly, the signal conversion module 220 may be further configured for performing analog-to-digital conversion on the analog signal transmitted by the first coupling unit 300, and transmitting a digital signal obtained by analog-to-digital conversion to the second digital processing module 210.

In this embodiment, related devices for digital signal processing are generally relatively expensive. In a manner of concentrating a digital processing capability on the access unit and the extended unit, the related devices for digital signal processing are placed on the access unit and the extended unit, and a signal transmitted by the extended unit to the remote cascaded chain by means of the first coupling unit is an analog signal, thereby constructing a "digital+analog" indoor distribution system. With the development of the indoor distribution system, the number of the remote units thereof is greater than that of the access unit and the extended unit. Therefore, the "digital+analog" indoor distribution system can save a lot of related devices for digital signal processing, thereby reducing the cost, so that the system is expandable in capacity and simple in construction, operation and maintenance.

Figure 8:
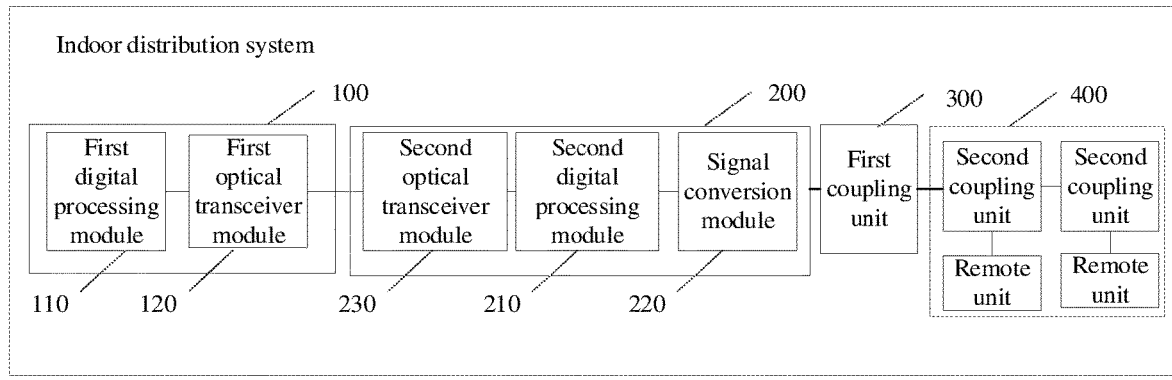
FIG. 8 is a schematic structural diagram of yet another indoor distribution system according to an embodiment of the present disclosure.

FIG. 8 is a schematic structural diagram of yet another indoor distribution system according to an embodiment of the present disclosure. FIG. 8 is based on the embodiment shown in FIG. 7. Further, as shown in FIG. 8, the access unit 100 further includes a first optical transceiver module 120, and the extended unit 200 further includes a second optical transceiver module 230.

The first optical transceiver module 120 is connected to the second optical transceiver module 230 by means of an optical fiber.

The first optical transceiver module 120 converts an electrical signal outputted by the first digital processing module into an optical signal, so as to transmit, by means of the optical fiber, the optical signal obtained by conversion. The first optical transceiver module 120 is also configured for converting an optical signal received by the extended unit 200 into an electrical signal, so as to transmit the electrical signal obtained by conversion to the first digital processing module.

The second optical transceiver module 230 converts an electrical signal outputted by the second digital processing module into an optical signal, so as to transmit, by means of the optical fiber, the optical signal obtained by conversion. The second optical transceiver also converts an optical signal received by the access unit 100 into an electrical signal, so as to transmit the electrical signal obtained by conversion to the second digital processing module.

In some embodiments, the first optical transceiver module 120 further performs rate adjustment and protocol conversion on the signal transmitted by the first digital processing module, and then transmits the signal to the extended unit 200.

In some embodiments, the second optical transceiver module 230 is configured for communicating and transmitting an optical fiber signal from the access unit 100 or the extended unit 200. The communicating and transmitting includes, but is not limited to, one or more of the following processing: communication protocol interaction, transmission rate matching, error correction and retransmission of optical fiber transmission, optical module information extraction, and the like. The second optical transceiver module 230 is further configured for connecting the processed data to the second digital processing module.

In some embodiments, the second optical transceiver module 230 may include at least one optical transceiver device.

Figure 9:
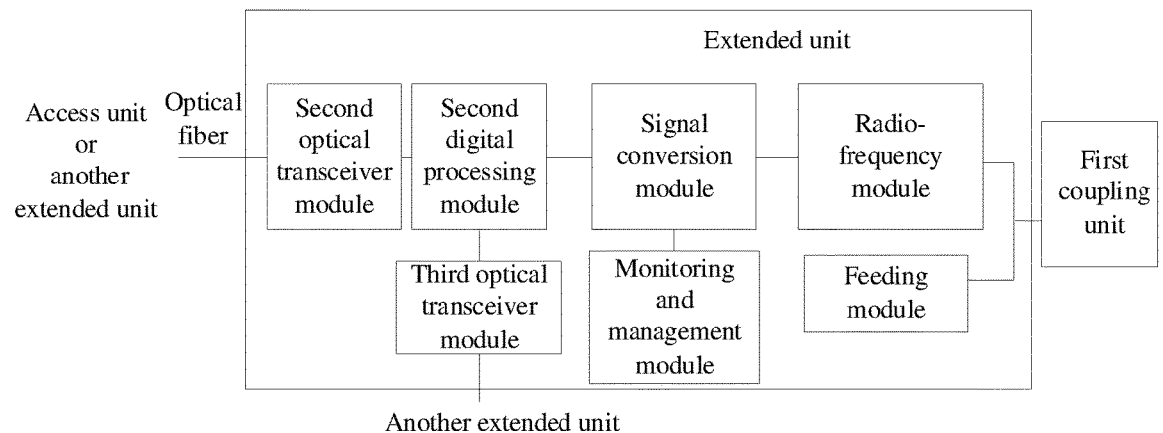
FIG. 9 is a schematic structural diagram of an extended unit according to an embodiment of the present disclosure.

In some embodiments, FIG. 9 is a schematic structural diagram of an extended unit according to an embodiment of the present disclosure. FIG. 9 is based on the embodiment shown in FIG. 8. Further, as shown in FIG. 9, the extended unit may further include: a third optical transceiver module, a monitoring and management module, and a radio-frequency module.

The third optical transceiver module is configured for communicating and transmitting an optical fiber signal from a next-stage extended unit. The communicating and transmitting includes, but is not limited to, one or more of the following processing: communication protocol interaction, transmission rate matching, error correction and retransmission of optical fiber transmission, optical module information extraction, and the like. The third optical transceiver module is further configured for transmitting the processed data to the second digital processing module.

In some embodiments, the third optical transceiver module may include at least one optical transceiver device.

The monitoring and management module generates a monitoring signal for the extended unit and managing monitoring information for the remote unit. The monitoring and management module transmits the generated monitoring information to the signal conversion module, and processes the monitoring information transmitted by the signal conversion module.

The radio-frequency module processes the radio-frequency signal transmitted by the signal conversion module and transmits the processed radio-frequency signal to the coupling unit. The radio-frequency module further processes the radio-frequency signal of the coupling unit and transmits the processed radio-frequency signal to the signal conversion module. The radio-frequency may process the radio-frequency signal in, but not limited to, one or more of the following processing manners: radio-frequency signal filtering, radio-frequency signal amplification, radio-frequency signal attenuation, radio-frequency up-conversion, radio-frequency down-conversion, envelope signal extraction and comparison, power detection, and the like.

In some embodiments, the extension unit may further include a feeding module.

The feeding module supplies power to the first coupling unit and the remote cascaded chain. The feeding module may include, but is not limited to, one or more of the following processing manners: AC-DC conversion, input voltage detection, input current detection, input power signal filtering, output voltage filtering, output power detection, and the like.

Through the arrangement of the feeding module, a centralized feeding network is used in the system to provide remote power supply to the remote unit by means of the coupling unit, which can effectively reduce the construction difficulty.

In practical application, the electrical signals required to be transmitted between the access unit and the extended unit may be converted into optical signals by means of their respective optical transceiver modules, and the optical signals are transmitted by means of optical fibers.

In this embodiment, the optical signals are transmitted by means of optical fibers, so that the signal transmission efficiency is higher and the quality of signals outputted is better.

On the basis of the above embodiments, further, a signal received by the access unit includes one or more of the following signals: a first signal, a second signal, a third signal, and a fourth signal.

The first signal is a signal transmitted by an RRU of a base station by means of a wireless coupler, the second signal is a signal transmitted by the RRU of the base station by means of a wired coupler, the third signal is a signal transmitted by a BBU of the base station, and the fourth signal is a signal transmitted by a core network.

In practical application, an input signal of the access unit includes one or more of the following:
  wireless coupling input of the RRU of the base station, including, but not limited to, an air radio-frequency signal inputted by one or more RRUs of the base station;
  a wired coupling radio-frequency signal inputted by the RRU of the base station;
  a digital signal inputted by the BBU of the base station, including input of a conventional BBU based on a private protocol and input of an open base station processing unit (Open RAN BBU) based on a public protocol; and
  a service signal inputted by a core network unit.

In this embodiment, through flexible configuration of the access unit, processing of different information sources, including air-coupled radio-frequency signals, base station RRU wired coupling radio-frequency signals, base station BBU digital signals, and core network digital service signals, is met, thereby realizing input of various signal sources.

Figure 10:
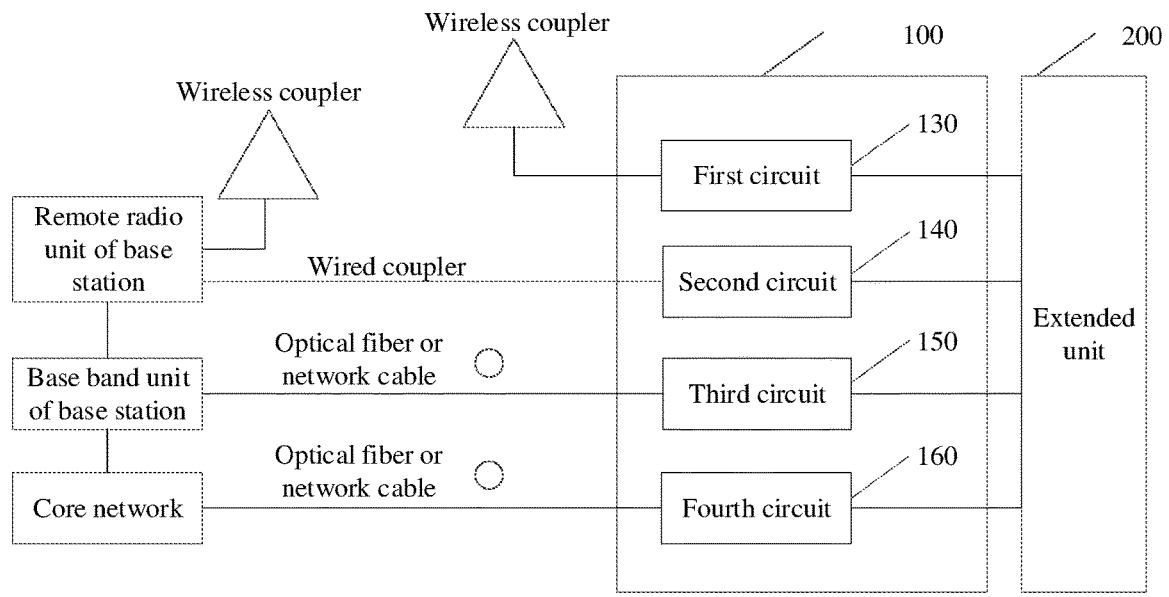
FIG. 10 is a schematic structural diagram of an access unit according to an embodiment of the present disclosure.

FIG. 10 is a schematic structural diagram of an access unit according to an embodiment of the present disclosure. FIG. 10 is based on the embodiments shown in any one of FIG. 2 to FIG. 9. Further, as shown in FIG. 10, the access unit includes one or more of the following circuits: a first circuit 130, a second circuit 140, a third circuit 150, and a fourth circuit 160.

The first circuit 130 is connected to the RRU of the base station by means of the wireless coupler, and the first circuit 130 is connected to the extended unit. The second circuit 140 is connected to the RRU of the base station by means of the wired coupler, and the second circuit 140 is connected to the extended unit. The third circuit 150 is connected to the BBU of the base station and the extended unit, respectively. The fourth circuit 160 is connected to the core network and the extended unit, respectively.

The first circuit 130 is configured for processing the received first signal to obtain a processed first signal, and transmitting the processed first signal to the extended unit.

The second circuit 140 is configured for processing the received second signal to obtain a processed second signal, and transmitting the processed second signal to the extended unit.

The third circuit 150 is configured for processing the received third signal to obtain a processed third signal, and transmitting the processed third signal to the extended unit.

The fourth circuit 160 is configured for processing the received fourth signal to obtain a processed fourth signal, and transmitting the processed fourth signal to the extended unit.

In practical application, the extended unit supports a first frequency band, a second frequency band, a third frequency band, and a fourth frequency band, and the remote unit supports the first frequency band, the second frequency band, the third frequency band, and the fourth frequency band. The first frequency band is a frequency band corresponding to a radio-frequency signal received by the access unit from the RRU of the base station in the air by means of the wireless coupler, the second frequency band is a corresponding frequency band when the access unit is connected to the RRU of the base station by means of the wired coupler, the third frequency band is a corresponding frequency band when the access unit is connected to the BBU of the base station, and the fourth frequency band is a corresponding frequency band when the access unit is connected to the core network.

In some embodiments, the first digital processing module may include one or more of the following modules: a first digital processing submodule, a second digital processing submodule, a main control module, and a control module. The first photoelectric conversion module may include one or more of the following modules: a first optical module, a second optical module, a third optical module, and a fourth optical module.

Figure 11:
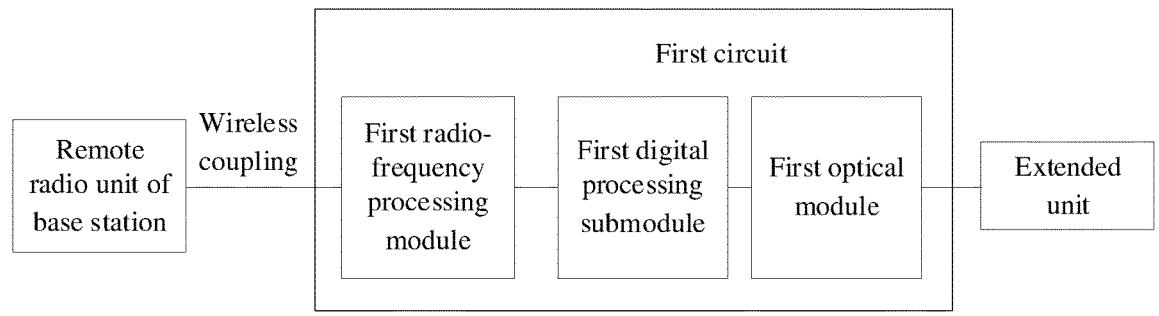
FIG. 11 is a schematic structural diagram of a first circuit according to an embodiment of the present disclosure.

In some embodiments, FIG. 11 is a schematic structural diagram of a first circuit according to an embodiment of the present disclosure. As shown in FIG. 11, the first circuit includes a first radio-frequency processing module, a first digital processing submodule, and a first optical module.

The first radio-frequency processing module performs radio-frequency filtering (including multiple or single frequency selective filtering), gain adjustment of the filtered radio-frequency signal, and analog-to-digital signal conversion on a wireless coupling radio-frequency signal, and then transmitting the signal to the first digital processing submodule.

The first digital processing submodule performs framing or deframing, synchronous signal extraction, digital filtering, and sampling rate conversion on the signal transmitted by the first radio-frequency processing module, and then transmits the signal to the first optical module.

The first optical module performs rate adjustment and protocol conversion on the signal received by the first digital processing submodule, and then transmits the signal to the extended unit.

In practical application, the first circuit is connected to the RRU of the base station by means of the wireless coupler, converts a wireless coupling radio-frequency signal inputted by the RRU of the base station into an optical signal, and then transmits the optical signal to the extended unit. Therefore, the access unit can be used for processing the signal inputted by the RRU of the base station accessed by the wireless coupler.

Figure 12:
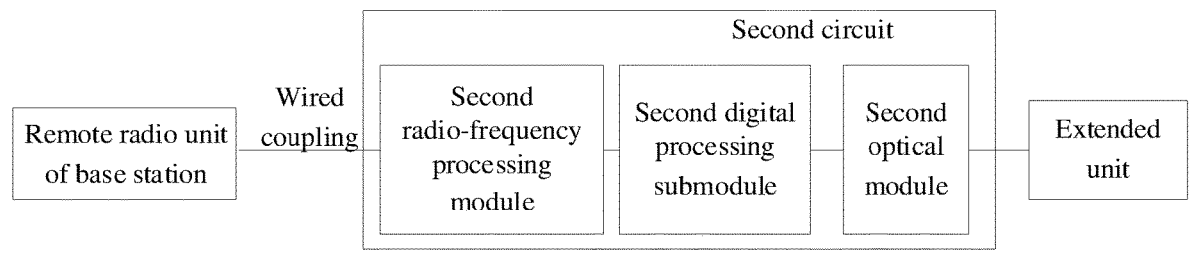
FIG. 12 is a schematic structural diagram of a second circuit according to an embodiment of the present disclosure.

In some embodiments, FIG. 12 is a schematic structural diagram of a second circuit according to an embodiment of the present disclosure. As shown in FIG. 12, the second circuit includes a second radio-frequency processing module, a second digital processing submodule, and a second optical module.

The second radio-frequency processing module performs signal power detection, radio-frequency gain control, radio-frequency filtering, gain adjustment of the filtered radio-frequency signal, and analog-to-digital conversion on a wired coupling radio-frequency signal, and then transmits the signal to the second digital processing submodule.

The second digital processing submodule performs framing or deframing, synchronous signal extraction, digital filtering, and sampling rate conversion on the signal transmitted by the second radio-frequency processing module, and then transmits the signal to the second optical module.

The second optical module performs rate adjustment and protocol conversion on the signal received by the second digital processing submodule, and then transmitting the signal to the extended unit.

In practical application, the second circuit is connected to the RRU of the base station by means of the wired coupler, converts a wired coupling radio-frequency signal inputted by the RRU of the base station into an optical signal, and then transmits the optical signal to the extended unit.

Figure 13:
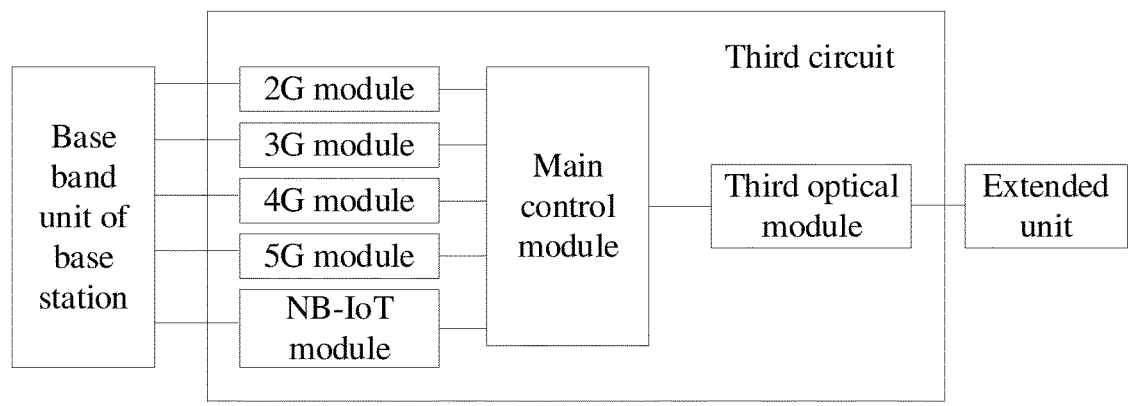
FIG. 13 is a schematic structural diagram of a third circuit according to an embodiment of the present disclosure.

In some embodiments, FIG. 13 is a schematic structural diagram of a third circuit according to an embodiment of the present disclosure. As shown in FIG. 13, the third circuit includes a first standard module, a main control module, and a third optical module. The first standard module includes, but is not limited to, one or more of the following modules: a 2G module, a 3G module, a 4G module, a 5G module, and an NB-IoT module.

The 2G module transmits a 2G-standard electrical signal to the main control module by means of modulation and demodulation, framing or deframing, digital filtering and shaping.

The 3G module transmits a 3G-standard electrical signal to the main control module by means of modulation and demodulation, framing or deframing, digital filtering and shaping.

The 4G module transmits a 4G-standard electrical signal to the main control module by means of modulation and demodulation, framing or deframing, digital filtering and shaping. In some embodiments, when the 4G module is used as a main access module, either a conventional base station BBU protocol—CPRI or an Enhanced Common Public Radio Interface (eCPRI) may be used.

The 5G module transmits a 5G-standard electrical signal to the main control module by means of modulation and demodulation, framing or deframing, digital filtering and shaping. Similarly, in actual implementation, when the 5G module is used as the main access module, either a conventional base station BBU protocol—CPRI or an eCPRI may be used.

The NB-IoT module transmits an NB-IoT-standard electrical signal to the main control module by means of modulation and demodulation, framing or deframing, digital filtering and shaping.

The main control module performs data merging, sampling rate conversion, and transmission rate matching on the signal transmitted by the first standard module, and transmits the signal to the third optical module.

The third optical module performs rate adjustment and protocol conversion on the signal transmitted by the main control module, and then transmits the signal to the extended unit.

In practical application, the third circuit is connected to the BBU of the base station by means of an optical fiber or a network cable, converts an electrical signal transmitted by the BBU of the base station into an optical signal, and then transmits the optical signal to the extended unit.

Figure 14:
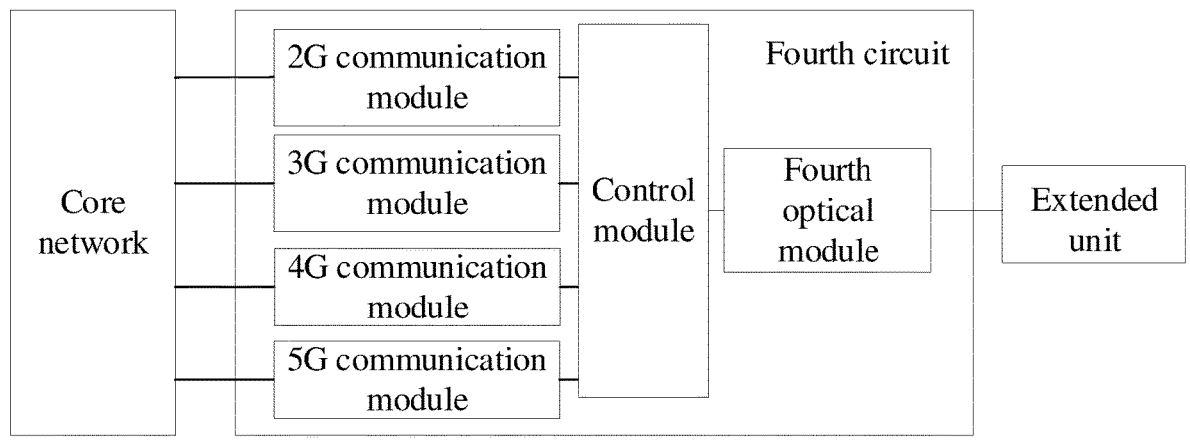
FIG. 14 is a schematic structural diagram of a fourth circuit according to an embodiment of the present disclosure.

In some embodiments, FIG. 14 is a schematic structural diagram of a fourth circuit according to an embodiment of the present disclosure. As shown in FIG. 14, the fourth circuit includes a second standard module, a control module, and a fourth optical module. The second standard module includes, but is not limited to, one or more of the following modules: a 2G communication module, a 3G communication module, a 4G communication module, and a 5G communication module.

The 2G communication module transmits a 2G-standard electrical signal to the control module by means of core network interface interconnection and baseband signal processing (2G signal encoding and decoding, modulation and demodulation, and signaling processing).

The 3G communication module transmits a 3G-standard electrical signal to the control module by means of core network interface interconnection and baseband signal processing (3G signal encoding and decoding, modulation and demodulation, and signaling processing).

The 4G communication module transmits a 4G-standard electrical signal to the control module by means of core network interface interconnection and baseband signal processing (4G signal encoding and decoding, modulation and demodulation, and signaling processing).

The 5G communication module transmits a 5G-standard electrical signal to the control module by means of core network interface interconnection and baseband signal processing (5G signal encoding and decoding, modulation and demodulation, and signaling processing).

The control module performs data merging, sampling rate conversion, and transmission rate matching on the signal transmitted by the second standard module, and transmits the signal to the fourth optical module.

The fourth optical module performs rate adjustment and protocol conversion on the signal transmitted by the control module, and then transmits the signal to the extended unit.

In practical application, the fourth circuit is connected to the core network by means of an optical fiber or a network cable, converts an electrical signal transmitted from the core network into an optical signal, and then transmits the optical signal to the extended unit.

In this embodiment, through flexible configuration of the access unit, processing of different information sources, including air-coupled radio-frequency signals, base station RRU wired coupling radio-frequency signals, base station BBU digital signals and/or core network digital service signals, is met, thereby realizing input of various signal sources.

The modules and units described in the above embodiments may be implemented in whole or in part by software, hardware, and combinations thereof. Each of the above modules and units may be embedded in or independent of a processor in a form of hardware, or may be stored in a memory in a form of software, so as to be called by the processor to perform the operations corresponding to the above modules and units.

Figure 15:
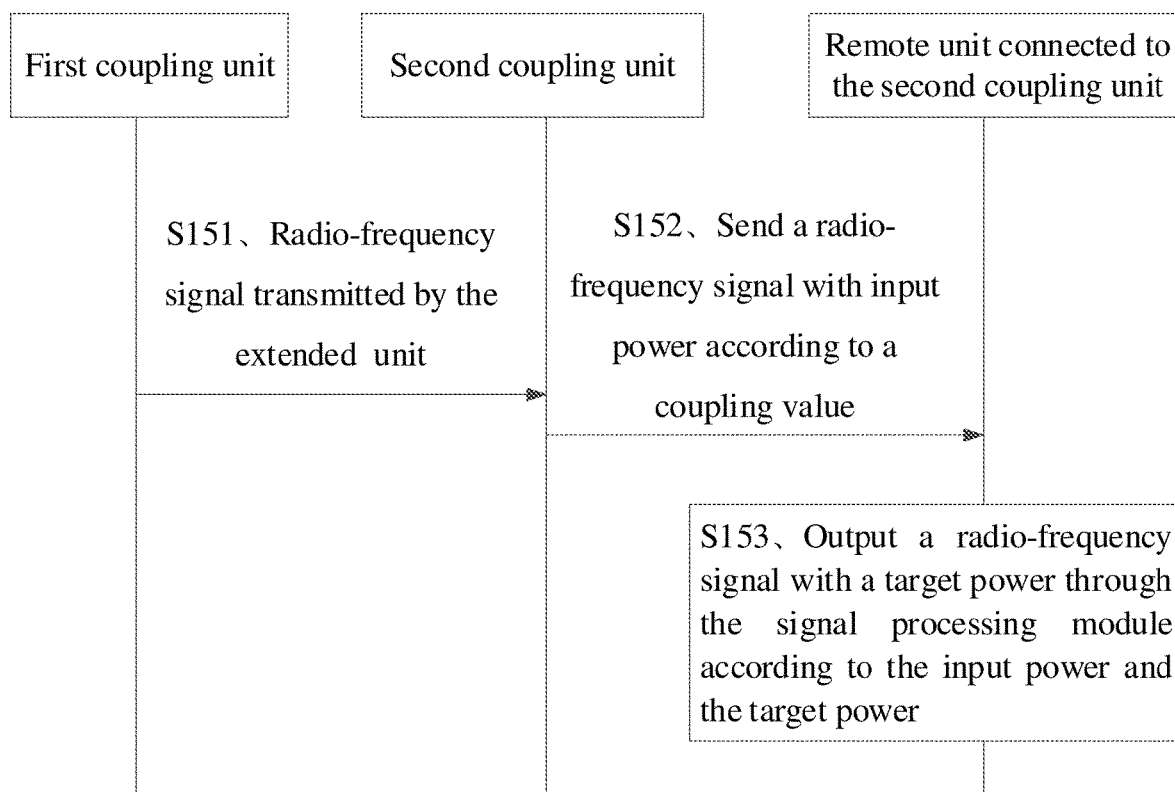
FIG. 15 is a schematic flowchart of a signal transmission method according to an embodiment of the present disclosure.

FIG. 15 is a schematic flowchart of a signal transmission method according to an embodiment of the present disclosure, applied to an indoor distribution system. The indoor distribution system includes any one of the indoor distribution systems in the above system embodiments. The method provided in this embodiment may include the following steps.

In S151, the first coupling unit transmits a radio-frequency signal transmitted by the extended unit to the second coupling unit.

In S152, the second coupling unit transmits a radio-frequency signal with input power to the remote unit connected to the second coupling unit according to a coupling value.

In S153, the remote unit outputs, by means of the signal processing module, a radio-frequency signal with a target power according to the input power and the target power.

An implementation principle and a technical effect of the method in this embodiment are similar to those of the above system embodiments. Details are not described herein again.

INDUSTRIAL APPLICABILITY

In the indoor distribution system provided in the present disclosure, the second coupling unit divides output power thereof according to a coupling value, and transmits the radio-frequency signal to the remote unit and the next-stage second coupling unit connected thereto. The remote unit automatically controls the gain of the signal processing module thereof according to the input power and the target power, adjusts the power of the radio-frequency signal from the input power to the target power, and outputs the same. Each remote unit can output the radio-frequency signal with the target power by means of its own adjustment, so that the second coupling units in the remote cascaded chain can be set to one type. Therefore, the design and construction difficulties can be reduced, which improves the feasibility of the indoor distribution system and has strong industrial applicability.

What is claimed is:

1. An indoor distribution system, comprising:
an access unit;
an extended unit;
a first coupling unit; and
at least one remote cascaded chain, each remote cascaded chain comprising at least one second coupling unit and at least one remote unit, and each remote unit comprising a signal processing module;
wherein the at least one second coupling unit in each remote cascaded chain is cascaded, and each remote unit is respectively connected to its corresponding second coupling unit;
the first coupling unit transmits a radio-frequency signal transmitted by the extended unit to the at least one second coupling unit;
the at least one second coupling unit transmits a radio-frequency signal with input power to the remote unit connected to the at least one second coupling unit according to a coupling value, wherein the coupling value of the at least one second coupling unit in each remote cascaded chain is the same; and
the at least one remote unit adjusts the power of the radio-frequency signal from the input power to a target power, through the signal processing module according to the input power and the target power, and outputs the adjusted radio-frequency signal;
wherein the target power corresponding to each remote unit in each remote cascaded chain is the same.

2. The system according to claim 1, wherein the signal processing module each comprises an attenuator, a switch, and an amplifier; each remote unit further comprises a monitoring processing module, wherein the monitoring processing unit further comprises an input signal detection module and a monitoring module;
the monitoring module is connected to the input signal detection module; the attenuator is successively connected to the switch and the amplifier; and the monitoring module is respectively connected to the attenuator and the switch;
the attenuator receives the radio-frequency signal with the input power transmitted by the second coupling unit;
the input signal detection module determines an input power and transmits the input power to the monitoring module; and
the monitoring module determines a gain value according to the input power and the target power, and adjusts the attenuator according to the gain value, to cause the amplifier outputs a radio-frequency signal with the target power;
wherein the gain value is a ratio of the target power to the input power.

3. The system according to claim 1, wherein coupling values of the second coupling units comprised in each single remote cascaded chain are the same; and
coupling values of the second coupling units comprised in different remote cascaded chains are the same or different.

4. The system according to claim 1, wherein the access unit comprises a first digital processing module, and the extended unit comprises a second digital processing module and a signal conversion module;
the extended unit is connected to the first coupling unit; the extended unit is directly connected to the access unit, or is connected to the access unit by means of another extended unit;
the access unit performs a first processing on a received signal by means of the first digital processing module to obtain a first digital signal, and transmits the first digital signal to the extended unit; and
the extended unit performs a second processing on the first digital signal through the second digital processing module and the signal conversion module to obtain a first analog signal, and transmits the first analog signal to the first coupling unit.

5. The system according to claim 4, wherein the access unit further comprises a first optical transceiver module; and the extended unit further comprises a second optical transceiver module;
the first optical transceiver module being connected to the second optical transceiver module by means of an optical fiber.

6. The system according to claim 1, wherein a signal received by the access unit comprises one or more of the following signals: a first signal, a second signal, a third signal, and a fourth signal;
  wherein the first signal is a signal transmitted by a remote radio unit (RRU) of a base station by means of a wireless coupler, the second signal is a signal transmitted by the RRU of the base station by means of a wired coupler, the third signal is a signal transmitted by a base band unit (BBU) of the base station, and the fourth signal is a signal transmitted by a core network.

7. The system according to claim 6, wherein the access unit comprises one or more of the following circuits: a first circuit, a second circuit, a third circuit, and a fourth circuit, wherein
  the first circuit is connected to the RRU of the base station by means of the wireless coupler, and the first circuit is connected to the extended unit; the second circuit is connected to the RRU of the base station by means of the wired coupler, and the second circuit is connected to the extended unit; the third circuit is connected to the BBU of the base station and the extended unit, respectively; and the fourth circuit is connected to the core network and the extended unit, respectively;
  the first circuit is configured for processing the received first signal to obtain a processed first signal, and transmitting the processed first signal to the extended unit;
  the second circuit is configured for processing the received second signal to obtain a processed second signal, and transmitting the processed second signal to the extended unit;
  the third circuit is configured for processing the received third signal to obtain a processed third signal, and transmitting the processed third signal to the extended unit; and
  the fourth circuit is configured for processing the received fourth signal to obtain a processed fourth signal, and transmitting the processed fourth signal to the extended unit.

8. The system according to claim 1, wherein the extended unit transmits a power supply signal and the radio-frequency signal to the first coupling unit;
  the first coupling unit transmits the power supply signal and the radio-frequency signal to the at least one remote cascaded chain; and
  the at least one second coupling unit transmits the power supply signal and the radio-frequency signal to the remote unit connected to the at least one second coupling unit and other second coupling units connected to the at least one second coupling unit respectively.

9. The system according to claim 8, wherein the at least one second coupling unit in each remote cascaded chain is cascaded by means of a radio frequency cable, and each second coupling unit is connected to one remote unit by means of a radio frequency cable; and the first coupling unit is connected to the first-stage second coupling unit in each remote cascaded chain by means of a radio frequency cable.

10. The system according to claim 8, wherein the at least one second coupling unit in each remote cascaded chain is cascaded by means of a feeder, each second coupling unit is connected to one remote unit by means of a feeder, and the first coupling unit is connected to the first-stage second coupling unit in each remote cascaded chain by means of a feeder.

11. A signal transmission method, applied to an indoor distribution system, the indoor distribution system comprising an access unit, an extended unit, a first coupling unit, and at least one remote cascaded chain, wherein each remote cascaded chain comprises at least one second coupling unit and at least one remote unit; wherein each remote unit comprises a signal processing module; the at least one second coupling unit in each remote cascaded chain is cascaded, and each remote unit is respectively connected to its corresponding second coupling unit; wherein the method comprises:
  transmitting, by the first coupling unit, a radio-frequency signal transmitted by the extended unit to the at least one second coupling unit;
  transmitting, by the at least one second coupling unit, a radio-frequency signal with input power to the remote unit connected to the at least one second coupling unit according to a coupling value, wherein the coupling value of the at least one second coupling unit in each remote cascaded chain is the same; and
  adjusting, by the at least one remote unit, through the signal processing module, the power of the radio-frequency signal from the input power to a target power according to the input power and the target power, and outputting the adjusted radio-frequency signal, wherein the target power corresponding to each remote unit in each remote cascaded chain is the same.

* * * * *